US005695664A

United States Patent [19]

Loubet et al.

[11] Patent Number: 5,695,664

[45] Date of Patent: Dec. 9, 1997

[54] PLASMA TORCH WITH A SUBSTANTIALLY AXI-SYMMETRICAL GENERAL STRUCTURE

[75] Inventors: Daniel Loubet, Saint Aubin de Medoc; Jacques Jean-Marie Spariat, Saint Medard en Jalles, both of France

[73] Assignee: Aerospatiale Societe Nationale Industrielle, Societe Anonyme, Paris Cedex, France

[21] Appl. No.: 666,790

[22] Filed: Jun. 19, 1996

[30] Foreign Application Priority Data

Jun. 23, 1995 [FR] France ........................ 95 07790

[51] Int. Cl.$^6$ ........................ B23K 10/00

[52] U.S. Cl. ........................ 219/121.52; 219/121.49; 219/121.48; 219/121.57; 313/231.31

[58] Field of Search ........................ 219/121.49, 121.48, 219/121.51, 121.52, 74, 75; 313/231.41, 231.31; 315/111.21

[56] References Cited

U.S. PATENT DOCUMENTS

| | | | |
|---|---|---|---|
| 4,668,853 | 5/1987 | Fey et al. | 219/121.48 |
| 5,132,511 | 7/1992 | Labrot et al. | 219/121.49 |
| 5,210,392 | 5/1993 | Labrot et al. | 219/121.49 |
| 5,362,939 | 11/1994 | Hanus et al. | 219/121.59 |
| 5,451,740 | 9/1995 | Hanus et al. | 219/121.59 |

FOREIGN PATENT DOCUMENTS

| | | |
|---|---|---|
| 0427590 | 5/1991 | European Pat. Off. . |
| 0427592 | 5/1991 | European Pat. Off. . |
| 0490882 | 6/1992 | European Pat. Off. . |
| 2654294 | 5/1991 | France . |

*Primary Examiner*—Mark H. Paschall

*Attorney, Agent, or Firm*—Greenblum & Bernstein P.L.C.

[57] ABSTRACT

The present invention concerns a plasma torch with an approximately axi-symmetrical structure including a tubular bare torch portion having a single upstream electrode or a pair of coaxial upstream and downstream electrodes. The electrodes are tubular and cooled by a suitable cooling circuit. A field coil moves the arc foot. An injection mechanism injects a plasma gas downstream of the upstream electrode or between the upstream electrode and the downstream electrode. A starter mechanism ensures starting of the torch. An external structure integral with the bare torch at its proximal extremity includes fluid and electric linkings with the outside of the torch. The bare torch includes a bearer structure formed of three coaxial casings overlapping, at least partially, and integral with the external structure. The bearer structure includes a metallic external casing, an intermediate metallic casing defining with the external casing a circuit for return of cooling fluid of the electrode(s) and the field coil, and an internal casing defining with the intermediate metallic casing a circuit for admitting the plasma gas into the injection mechanism and channeling via its internal face an entering flow of the cooling fluid in a direction of the upstream electrode, the field coil, and possibly the downstream electrode.

11 Claims, 6 Drawing Sheets

PLASMA TORCH WITH A SUBSTANTIALLY AXI-SYMMETRICAL GENERAL STRUCTURE

BACKGROUND OF THE INVENTION

1. Field of the Invention

The present invention concerns plasma torches in particular, but not exclusively, non-transferred arc torches.

2. Discussion of Background

Generally speaking, a plasma torch of this type includes two coaxial tubular electrodes with one extending over the other and each disposed in a support encompassing it. Means are provided to produce the start of an electric arc between the two electrodes, as well as means to inject a plasma gas, such as air, into a chamber between the electrodes. Means for cooling the electrodes are also provided in each electrode support.

In addition, the plasma torch is preferably provided with means to move the locking foot of the electric arc onto the upstream electrode, said means being constituted by an electromagnetic coil surrounding the support of said upstream electrode.

The invention more particularly is applicable to a plasma torch whose starting of the electric arc is effected by a temporary short-circuit established between the electrodes by means of the temporary movement of the upstream electrode in contact with the downstream electrode with the aid of a starter jack.

So as to more specifically illustrate this type of plasma torch of the present invention, reference could be made to the embodiment of FIG. 4 of FR-A-2 654 294.

This embodiment concerns a compact plasma torch with a reduced spatial requirement intended to be mounted in waste vitrification ovens.

This torch generally comprises a tubular casing housing said upstream and downstream electrodes, as well as the plasma gas injection system, the electrode cooling system, the jack device for moving the upstream electrode for starting and the field coil for moving the arc foot.

Said casing is connected at its proximal extremity to a connection block ensuring fluid and electric links with the external portion of the torch which is secured to the wall of an oven by a flange system at the height of the joining point between said tubular casing and the rear connection portion, the tubular casing portion, so-called bare torch, being engaged in the oven.

The design of this type of plasma torch is complex and does not allow for the easy embodiment of bare torches of various lengths able to satisfy specific industrial requirements.

Moreover, the cooling of the electrodes is not entirely satisfactory and the complexity of the cooling circuit results in significant pressure drops making it necessary to resort to using high service pressures of about 12 bars, for example.

In addition, this high pressure has an effect on the pressure required for control of the jack for moving the upstream electrode on start up since during retraction of the upstream electrode following start up, said jack needs to overcome the downstream thrust exerted by the cooling fluid on the upstream electrode. This is why a pressure of about 160 bars is needed to activate said jack.

Finally, this type of torch does not offer easy accessibility to the expendable parts of the torch (upstream and downstream electrodes) and to adjustments, such as the position and displacement of the starter jack. In fact, in practice, it is necessary to completely dismantle the torch.

SUMMARY OF THE INVENTION

The present invention seeks to mitigate the various drawbacks mentioned above of this type of plasma torch and more generally non-transferred arc or transferred arc type plasma torches, irrespective of the start up system used, by proposing a torch with a simplified general architecture, almost entirely axi-symmetrical and therefore facilitating both the production of the torch and its maintenance.

To this effect, the invention concerns a plasma torch with an approximately axi-symmetrical general structure of the type including:

a tubular portion, so-called bare torch, housing a single upstream electrode or a pair of upstream and downstream coaxial electrodes, the electrodes being tubular and cooled by a suitable cooling circuit, a field coil for moving the arc foot and means to inject a plasma gas downstream of the upstream electrode or between the upstream electrode and the downstream electrode, means being provided in addition to ensure starting of the torch, and an external structure integral with the bare torch at its proximal extremity and grouping the fluid and electric links with the external portion of the torch, wherein said bare torch comprises a bearing structure formed of three coaxial casings overlapping one another at least partially, and integral with said external structure, namely an external metallic casing, a metallic intermediate casing defining with the external casing the cooling fluid return circuit of the electrode(s) and the coil, and an internal casing defining with the intermediate casing the circuit for admitting the plasmagene gas into said injection means and channelling via its internal face the entering flow of the cooling fluid in the direction of the upstream electrode, the field coil and possibly the downstream electrode.

This disposition makes it possible to reduce the number of elements of the torch and in particular provide the latter with the length required in relation to that of the successive casings, the bare torch receiving irrespective of its length standard internal elements, that is, the electrode(s), the field coil, the plasma gas injection system, the separators of the cooling circuit and the start up means.

According to one particular application of the invention for a non-transferred arc plasma torch provided with a start up device comprising a starter jack acting on the upstream electrode to bring it temporarily closer to the downstream electrode, said starter jack is disposed outside the body of said external structure and comprises a rod which traverses straight through the jack, is connected to the upstream electrode by a linking rod extending into the body of the external structure and into said internal casing and has a section enabling said entering flow of cooling fluid to exert on said jack rod a counter-pressure tending to counterbalance the pressure of said fluid on the upstream electrode, whereas the external extremity of the rod of the jack is provided with means for adjusting the displacement of this rod.

The structure of the invention also considerably simplifies the cooling circuit which exhibits pressure drops clearly smaller than those of the cooling circuit of known torches, thus making it possible with an equal cooling capacity to significantly reduce the pressure required by the fluid, for example from 12 to 6 bars, with the indirect advantageous consequence, in the case of non-transferred arc and start up starter torches, of a reduction in proportion to the pressure required to activate the starter jack.

Other characteristics and advantages shall appear more readily from a reading of the following description of an embodiment of a plasma torch conforming to the invention, said description being given solely by way of example.

DETAILED DESCRIPTION

Figure 1:
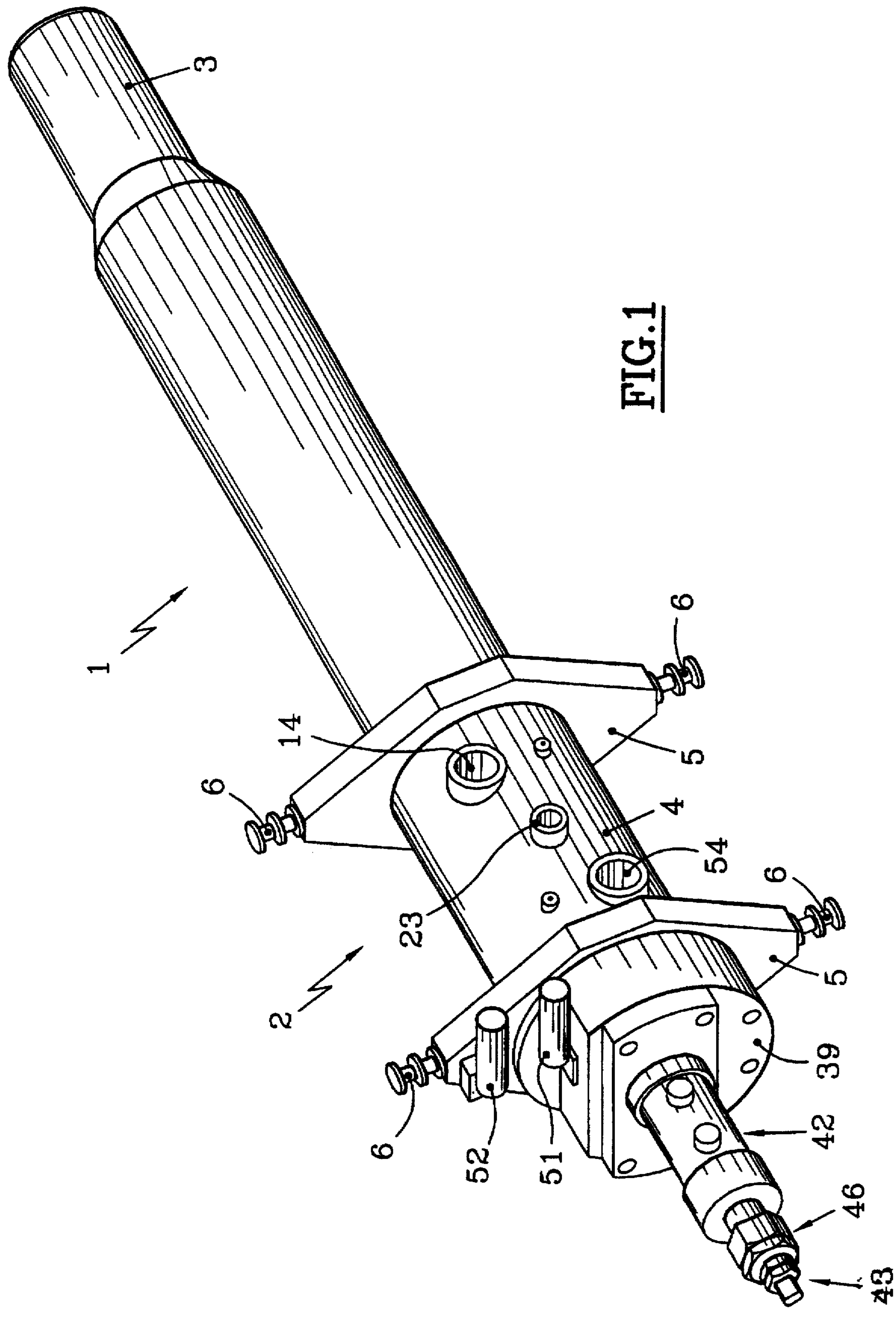
FIG. 1 is a diagrammatic perspective view of a plasma torch conforming to the invention.

FIG. 1 shows a plasma torch conforming to the invention and able to be used in a waste vitrification oven and formed of two main portions, namely a front generally cylindrical bare torch portion 1 and a rear connection portion 2 formed by an external structure ensuring the fluid and electric links of the torch with the outside and enabling the transport and handling of the torch.

The bare torch 1 has a distal extremity or nose 3 with a slightly reduced diameter, whereas the structure 2, known as an external structure as it remains outside the oven when the bare torch 1 is introduced into the latter by a suitable opening provided in the wall, is formed of a tubular body 4 coaxial to the bare torch 1, provided at its extremeties with two lozenge-shaped flanges 5 and bearing at their extremities journals 6 for lifting the torch up to a lifting beam (not shown).

According to one characteristic of the invention, the bare torch 1 comprises a bearing structure (FIG. 2) formed of three coaxial casings partially overlapping, namely an external metallic casing 7, an intermediate metallic casing 8 and an internal casing 9 made of an electrically nonconducting material.

The casing 7 is cylindrical, extends over the entire length of the bare torch 1 and is connected at its proximal extremity to the tubular body 4 of the external structure 2 by an annular linking part 10.

The casing 8 is also cylindrical, extends approximately over the length of the casing 7 with the largest diameter and inside the body 4 to which it is secured imperviously by a threaded crown 11 approximately in the central zone.

Provided between the two casings 7, 8 is an annular space 12 communicating with an annular space 13 defined between the body 4 and the casing 8.

Figure 2A:
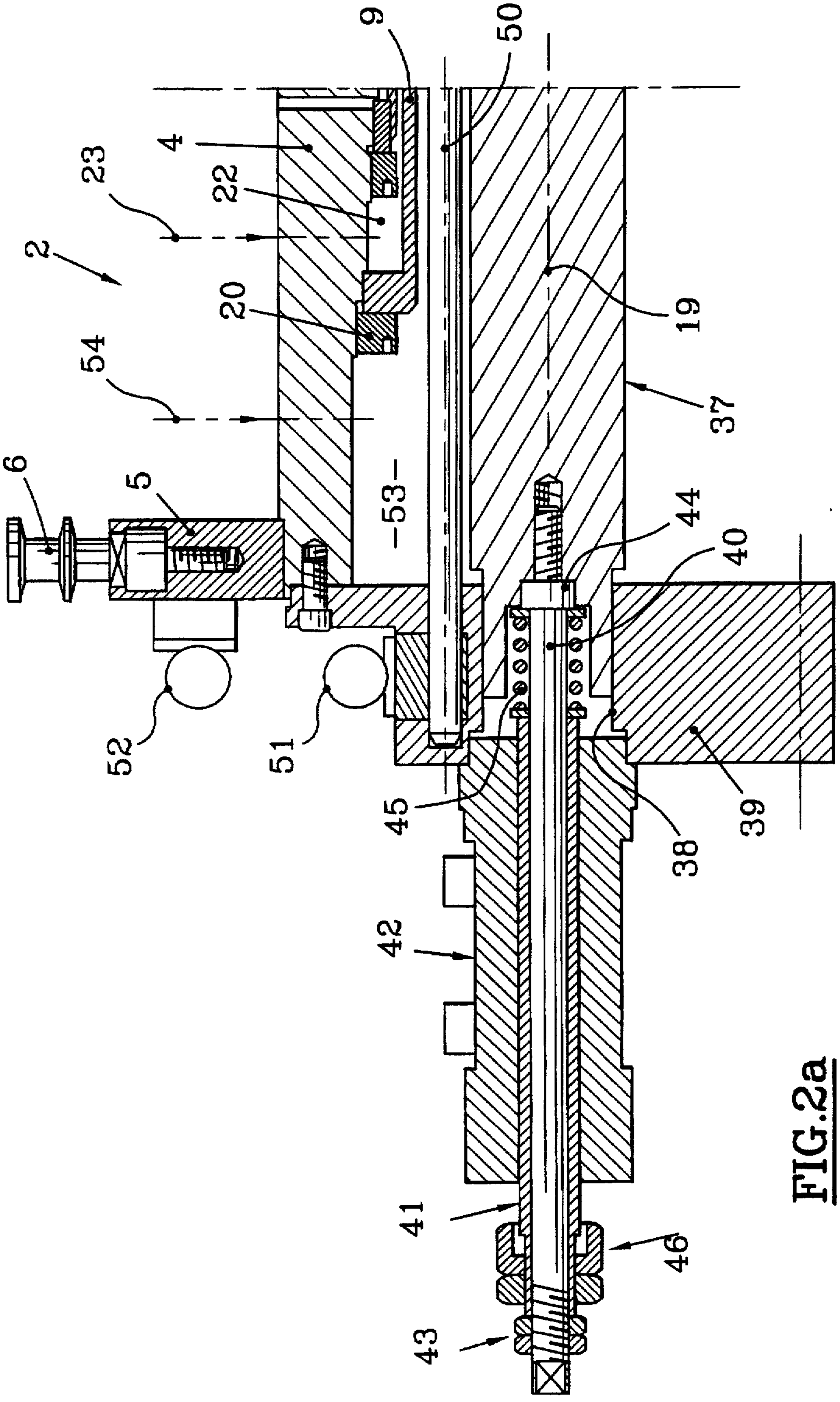
FIG. 2, divided respectively into 2*a*, 2*b* and 2*c* to improve readability, is an axial cutaway half-view of the torch of FIG. 1.
Figure 2B:
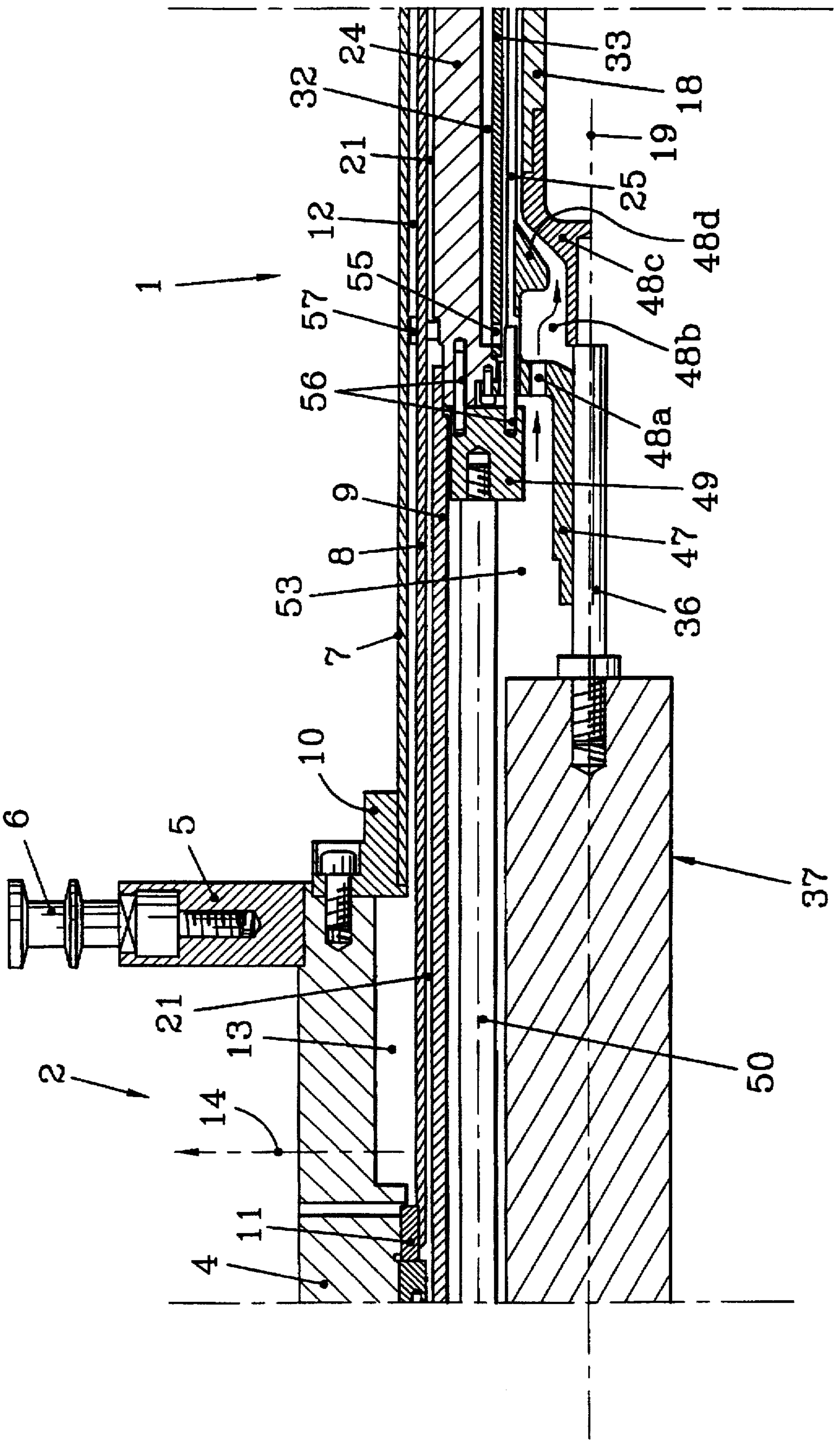
Figure 2C:
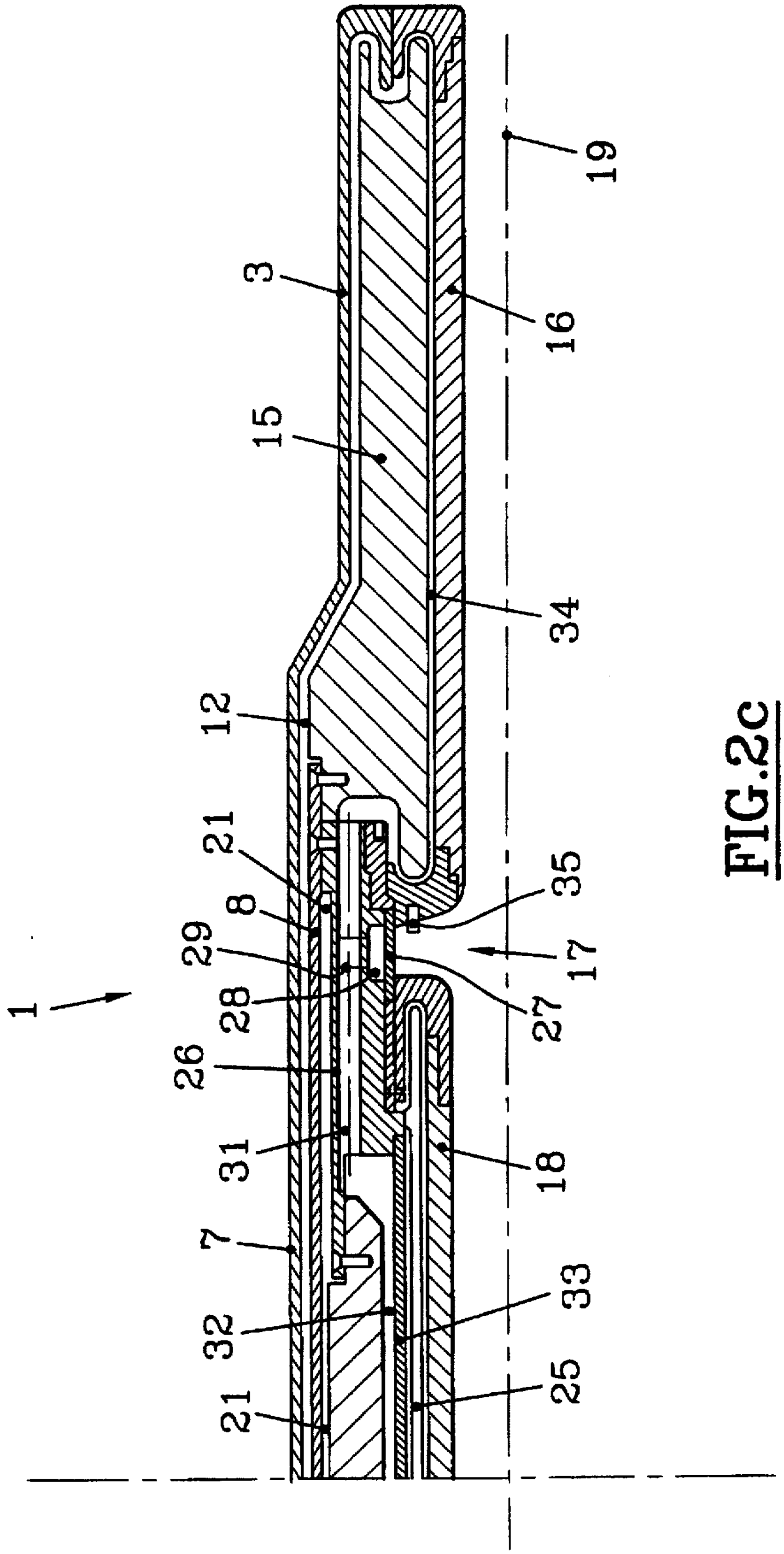
Figure 3:
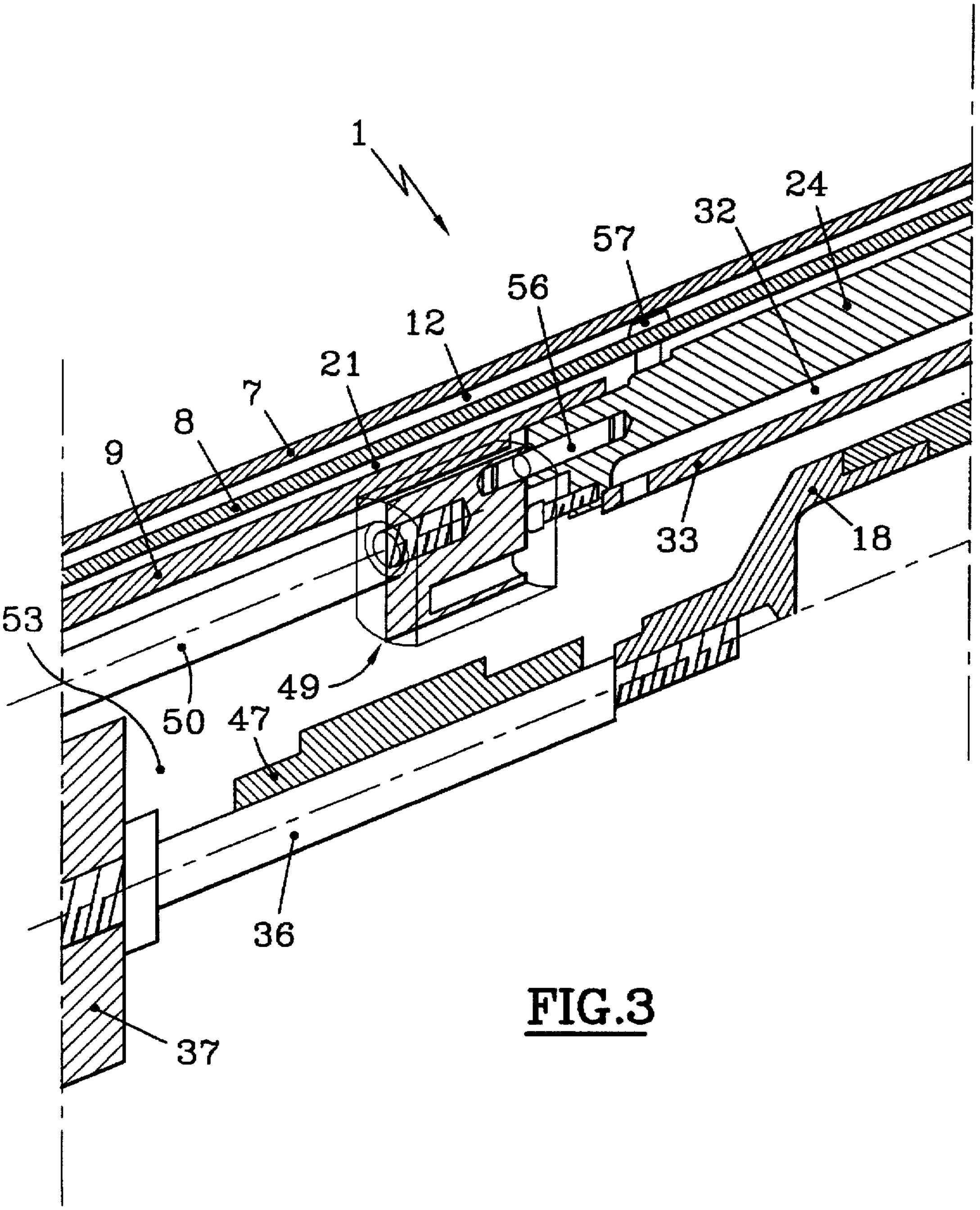
FIG. 3 is a sagittal sectional partial half-view of the torch portion at the height of the electric link between the upstream electrode and the connecting rod.

The space 13 communicates by a passage, shown at 14 in FIG. 1 and symbolized by the same numerical reference in FIG. 2, with a return pipe (not shown) for return of the cooling fluid (in this instance demineralized water) of the hot portion of the torch.

At its distal extremity, the intermediate casing 8 is used to support an annular separator 15 of the cooling circuit of the downstream electrode 16 which is a conventional annular electrode whose distal extremity is fixed to the nose of the torch.

The distal extremity of the intermediate casing 8 is also used, as shall be seen subsequently, for fixing the plasma gas injection system 17 and the distal extremity of the upstream electrode 18, which is also a conventional coaxial annular electrode like the downstream electrode 16, to the axis 19 of the torch.

The casing 9 is a cylindrical tube which extends approximately between the proximal extremity of the upstream electrode 18 and a location of the body 4 slightly behind the part 11 by being fixed to said body 4 by a threaded crown 20.

The tube 9 defines with the intermediate casing 8 an annular space 21 communicating on the structure side 2 with an annular space 22 inside the body 4 and communicating, via a passage shown at 23 in FIG. 1 and solely symbolized by the same numerical reference in FIG. 2, with an intake pipe (not shown) for admitting plasma fluid, in this instance air.

The distal extremity of the internal casing 9 is in sealed contact with the extremity of an annular separator 24 of the cooling circuit of the upstream electrode 18.

A conventional electromagnetic tubular coil known as a field coil 25 used to move the arc foot onto the upstream electrode 18 externally covers this electrode.

The distal extremity of the separator 24 is connected to the distal extremity of the intermediate casing 8 through an annular linking element 26 made of an electrically nonconducting material, which is a support for the plasma gas injection system.

This injection system (also see FIG. 4) includes a perforated annular grid 27 made of an electrically nonconducting material disposed in the gap between the electrodes 16, 18 and on the outer face where a homogenizing chamber 28 embodied in the element 26 is provided.

Figure 4:
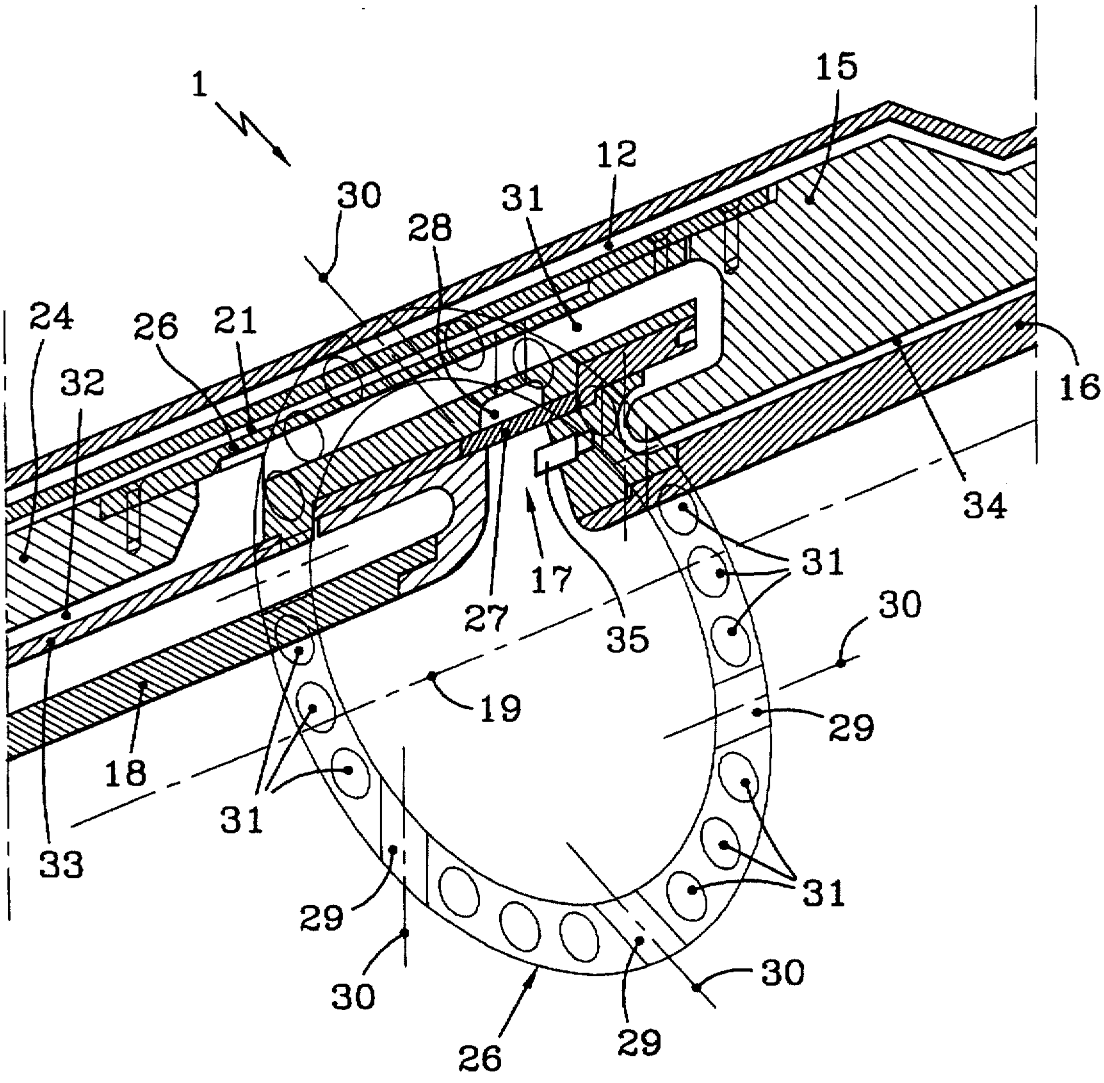
FIG. 4 is a sagittal sectional partial half-view of the torch at the height of the plasma gas injection system.

The chamber 28 communicates via holes 29 traversing the element 26 with the space 21. The holes 29 (six in this instance—cf. FIG. 4 showing a perspective views of a full section of the element 26) are regularly distributed and their axes 30 do not cut the axis of the element 26 so as to create a vortex effect when the air penetrates through the holes 29 into the homogenizing chamber 28.

In addition, the element 26 is pierced with a series of holes 31 with axes parallel to the axis of the element 26, that is the axis 19 of the torch, so as to successively ensure the continuity of the cooling circuit, the upstream electrode 18, the field coil 25 and then the downstream electrode 16.

FIG. 2 shows that the holes 31 make an annular space 32, defined between the separator 24 and a separator tube 33 encompassing at a distance the field coil 25, communicate with an annular space 34 delimited between the separator 15 and the downstream electrode 16.

Fixed at the proximal extremity of the downstream electrode 16 opposite the upstream electrode 18 is a stop pin 35 known as an ignition pin.

At its proximal extremity, the upstream electrode 18 is fixed to the extremity of a metallic copper rod 36 fixed to the extremity of an electrically non-conducting transmission axis with a large section and whose extremity is mounted sliding in a bore 38 of a flange 39 mounted on the external extremity of the body 4.

Said sliding extremity of the axis 37 is integral with a rod 40 extending inside a hollow rod 41 of a starter jack 42 fixed to the flange 39 outside the body 4.

The hollow rod 41 fully traverses the jack 42 and is integral at its outer extremity with the rod 40 by means of a pair 43 of a nut and counter-nut. At its other extremity, the rod 41 is in support against a washer 44 integral with the rod 40 by means of a damper spring 45.

A position-adjustable screw stop 46 on the jack rod 41 is able, via modification of its distance with respect to the extremity of the jack 42, to adjust the displacement of the jack rod.

The rod 36 bears a metallic bush 47 mounted sliding and integral with the support of the field coil 25, said bush 47 being connected on winding of said coil.

A bush 49 for electric connection to the coil 25 is fixed to the extremity of an electric connecting rod 50 parallel to the axis 19 extending opposite the internal tubular casing 9 and traversing the body 4 so as to be fixed to the flange 39 whose material is an electrically nonconductive material.

The rod 50 is connected to an electrical connection terminal 51 (+pole), the −pole being constituted by the connection terminal 52 connected to the metallic body 4.

The electric feed circuit of the electrodes therefore includes the rod 50, the element 49, the field coil 25 which is mounted in series, the element 47, the rod 36, the upstream electrode 18, the downstream electrode 16, the torch nose, the outer casing 7 and the body 4.

The internal casing 9 is in contact via its internal face with a space 53 delimitated by the body 4 and into the axis from which the rods 36 and 37 extend.

This space 53 communicates via a passage, shown at 54 in FIG. 1 and solely symbolized by the same numerical reference in FIG. 2, and is able to be connected to an intake pipe (not shown) for admitting the cooling water of the torch.

The cooling water circuit is thus constituted by the space 53 which communicates via holes **48*a* provided in the element 47 with an annular space 48*b* provided between the end piece 48*c* of the upstream electrode 18 and an annular deflector 48*d* forming a venturi element integral with the coil 25 and routing water towards the space between the upstream electrode 18 and the field coil 25. Then the water passes into the space between the coil 25 and the tube 33, into the space 32 (via perforations 55 at the proximal extremity of the tube 33), into the passages 31, into the space 34, and then into the space 12 and finally into the space 13. Thus, this circuit completely and as directly as possible sweeps the electrically conducting portions 50, 49, 47, the upstream end piece 48*c*, and then the outer face of the upstream electrode 18, the two faces of the field coil 25, the injection system 17, the outer face of the downstream electrode 16 and finally the outer face of the bare torch 1** over its entire length.

This circuit is relatively simple when compared with those of conventional torches. It present invention cooling of the hot portions of the torch and all its outer casing 7, which enables the torch to safely withstand the temperatures existing in the vitrification oven and which may often exceed 1600° C., sometimes reaching 2000° C.

In addition, the pressure drops of the cooling circuit are reduced with respect to those of conventional circuits which makes it possible to lower the service pressure of the cooling water source of the torch. This is why for a non-transferred arc torch of the present invention the pressure of the cooling water has been brought down from 12 to 6 bars.

It is important to mention that the design in the form of concentric tubular casings 7, 8 and 9 of the structure bearing the main elements (electrodes, injector, field coil) of the torch and connecting them to a connection block 2 makes it possible to have a large amount of freedom in determining the length of the bare torch 1.

For confirmation of this, it merely suffices to refer to FIG. 2 and the zone of the torch at the height of the rod 36 to verify that the modifications of the length of the bare torch shall simply have a repercussion on the length of the casings 7, 8, 9 and the rods 36, 37, 50.

Therefore, bare torches of various lengths could be equipped internally with the same elements (electrodes, injector, field coil, separator, electric linking element, etc), the circulations of fluids (air and water) being ensured similarly by means of the spaces provided between the various casings 7, 8, 9.

According to one important characteristic of the invention, the particular mounting of the starter jack 42 fully outside the body 4 with the large sectional connection rod 37 being immersed in the cooling water at the torch inlet makes it possible to firstly adjust the displacement of the jack and permits easy maintenance, and secondly allows the jack 42 to be controlled with a fluid at reduced pressure with respect to normal starter jacks.

In fact, the upstream electrode of torches of this type is cooled on the outside, the water pressure creates on the electrode a significant downward thrust.

Now, on start up, the upstream electrode is brought by the jack 42 into contact with the stop pin 35 on start up.

The duration of this contact needs to be sufficient so as to avoid the harmful consequences of a direct high amp short-circuit. It is then necessary to send the starter jack the appropriate power for suddendly retracting the upstream electrode whose power needs to overcome said downward thrust caused by the cooling water.

By providing in accordance with the invention an extremely large section on the connection rod 37, said thrust is compensated downwards so that less force is needed from the jack 42.

Thus, instead of a normal pressure of about 160 bars, the jack 42 can merely be fed at a pressure of basically less than one half the normal pressure.

If the pressure required for the starter jack can indeed be sufficiently lowered, such as down to 7 bars, it is possible to use the cooling water of the torch to activate the jack.

Moreover, the concentric structure of the casings 7, 8, 9 allows easy access inside the torch by starting with placing the outer casing 7 so as to replace the electrodes or any other element or any other maintenance or repair operation.

In this respect, it is to be noted that the extremity of the electric connection rod 50 is simply plugged in by means of the linking element 49 into the connection and/or centering pins 56 integral with the coil 25 and the separator 24.

It is also to be noted that the distal extremity of the casing 9 is not integral with the separator 24, which allows extraction of solely the casing 9 outside the torch so as to gain access to the fixing device (11) of the intermediate casing 8.

The mutual positioning of the casing 7, 8, 9 is ensured by guiding pins 57.

The invention is not merely limited to the embodiment described and shown above, but on the contrary covers all possible variants, especially as regards the disposition of the plasma gas injection system 17, that of the field coil 25, the means for controlling movement of the upstream electrode on start up, or even the disposition of the external structure 2.

Finally, the invention can be applied generally to all types of non-transferred arc torches, irrespective of the start up system, as well as to all types of transferred arc torches.

We claim:

1. Plasma torch having a substantially axi-symmetrical structure, comprising:

a tubular bare torch portion having at least one electrode, the at least one electrode being tubular and cooled by a cooling circuit;

a field coil for moving an arc foot;

a plasma injection mechanism for injecting a plasma gas downstream of one of the at least one electrode;

a starter mechanism for ensuring starting of the torch;

an external structure integral with the bare torch at a proximal end of the bare torch, the external structure including fluid and electric linkings; and wherein the bare torch includes a bearer structure formed of three coaxial casings at least partially overlapping each other and each coaxial casing being fixed with said external structure, the three coaxial casings comprising a metallic external casing, an intermediate metallic casing defining with the metallic external casing a circuit for return of cooling fluid of one of the at least one electrode and the field coil, and an internal casing defining with the intermediate metallic casing a circuit for admitting plasma gas into the injection mechanism and channeling via an internal face an entering flow of the cooling fluid in a direction of one of the at least one electrode and then the field coil, and wherein said at least one electrode and said field coil are electrically fed through an electric connection rod disposed within said internal casing, in parallel with an axis of the torch.

2. The plasma torch of claim 1, wherein the field coil externally surrounds one of the at least one electrode, is cooled on its internal and external faces, is electrically connected by firstly a pluggable link with one extremity of said electric connection rod disposed inside the internal casing, the other extremity of the electric connection rod being connected to an electric terminal of the external structure, the field coil secondly being electrically connected to one of the at least one electrode by a connection through a sliding contact with a linking rod between a starter jack and one of the at least one electrode.

3. The plasma torch of claim 1, wherein a space formed between the external metallic casing and the intermediate metallic casing communicates with a first annular space, a space formed between the intermediate metallic casing and the internal casing communicates with a second annular space, and a space formed by an inside of the internal casing communicates with a third annular space, wherein the first annular space communicates with a torch cooling fluid intake, the second annular space communicates with a plasma gas source, and the third annular space communicates with a torch cooling fluid outlet.

4. The plasma torch of claim 1, wherein the plasma injection mechanism is disposed inside the intermediate metallic casing and formed of an annular element provided with passages in a direction of a homogenizing chamber which is disposed on an internal face of the annular element, the annular element further including passages coaxial to an axis of the torch ensuring continuity of the cooling circuit, the annular element still further including a perforated injection grid opposite the homogenizing chamber.

5. The plasma torch of claim 1, wherein the internal casing forms a space in which the electric connection rod is disposed, and wherein the space within the internal casing communicates with a cooling fluid passage.

6. Plasma torch having a substantially axi-symmetrical structure, comprising:

a tubular bare torch portion having coaxial upstream and downstream electrodes, the electrodes being tubular and cooled by a cooling circuit;

a field coil for moving an are foot;

a plasma injection mechanism for injecting a plasma gas downstream of the upstream electrode;

a starter mechanism for ensuring starting of the torch;

an external structure integral with the bare torch at a proximal end of the bare torch, the external structure including fluid and electric linkings; and wherein the bare torch includes a bearer structure formed of three coaxial casings at least partially overlapping each other and each coaxial casing being fixed with said external structure, the three coaxial casings comprising a metallic external casing, an intermediate metallic casing defining with the metallic external casing a circuit for return of cooling fluid of the upstream electrode and the field coil, and an internal casing defining with the intermediate metallic casing a circuit for admitting plasma gas into the injection mechanism and channeling via an internal face an entering flow of the cooling fluid in a direction of the upstream electrode and then the field coil, and wherein said upstream and downstream electrodes and said field coil are electrically fed through an electric connection rod disposed within said internal casing, in parallel with an axis of the torch.

7. The plasma torch of claim 6, wherein the field coil externally surrounds the upstream electrode, is cooled on its internal and external faces, is electrically connected by firstly a pluggable link with one extremity of said electric connection rod disposed inside the internal casing, the other extremity of the electric connection rod being connected to an electric terminal of the external structure, the field coil secondly being electrically connected to the upstream electrode by a connection through a sliding contact with a linking rod being between a starter jack and the upstream electrode.

8. The plasma torch of claim 6, wherein a space formed between the external metallic casing and the intermediate metallic casing communicates with a first annular space, a space formed between the intermediate metallic casing and the internal casing communicates with a second annular space, and a space formed by an inside of the internal casing communicates with a third annular space, wherein the first annular space communicates with a torch cooling fluid intake, the second annular space communicates with a plasma gas source, and the third annular space communicates with a torch cooling fluid outlet.

9. The plasma torch of claim 7, wherein the plasma injection mechanism is disposed inside the intermediate metallic casing and formed of an annular element provided with passages in a direction of a homogenizing chamber which is disposed on an internal face of the annular element, the annular element further including passages coaxial to an axis of the torch ensuring continuity of the cooling circuit, the annular element still further including a perforated injection grid opposite the homogenizing chamber, the annular element being disposed in a gap between the upstream and downstream electrodes.

10. The plasma torch of claim 6, wherein the plasma torch is a non-transferred arc plasma torch, and wherein the starter mechanism further comprises a starter jack acting on the upstream electrode so as to momentarily bring the upstream electrode closer to the downstream electrode, the starter jack being disposed outside a body of the external structure, a jack rod traversing through the starter jack is connected to the upstream electrode by a linking rod extending into the body of the external structure, the jack rod also traversing into the internal casing and having a section enabling the entering flow of cooling fluid to exert on the jack rod a counter-pressure tending to counter-balance the pressure of the cooling fluid on the upstream electrode, an external extremity of the jack rod includes an adjustment mechanism for adjusting displacement of the jack rod.

11. The plasma torch of claim 6, wherein the internal casing forms a space in which the electric connection rod is disposed, and wherein the space within the internal casing communicates with a cooling fluid passage.

* * * * *